(12) United States Patent
Cruz et al.

(10) Patent No.: US 12,643,499 B2
(45) Date of Patent: Jun. 2, 2026

(54) INDICATOR LIGHT ASSEMBLY FOR A VEHICLE

(71) Applicant: NISSAN NORTH AMERICA, INC., Franklin, TN (US)

(72) Inventors: David Nicolas Cruz, State of Mexico (MX); Jesus Gibran Tellez Cacique, Mexico City (MX); Eduardo González Romo, Toluca (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 141 days.

(21) Appl. No.: 18/430,325

(22) Filed: Feb. 1, 2024

(65) Prior Publication Data
US 2025/0249855 A1 Aug. 7, 2025

(51) Int. Cl.
| | |
|---|---|
| *B60R 21/015* | (2006.01) |
| *B60Q 3/14* | (2017.01) |
| *F21V 19/00* | (2006.01) |
| *F21W 106/00* | (2018.01) |
| *F21Y 101/00* | (2016.01) |
| *F21Y 115/10* | (2016.01) |

(52) U.S. Cl.
CPC .......... *B60R 21/01566* (2014.10); *B60Q 3/14* (2017.02); *F21V 19/004* (2013.01); *F21W 2106/00* (2018.01); *F21Y 2101/00* (2013.01); *F21Y 2115/10* (2016.08)

(58) Field of Classification Search
CPC .... B60R 21/01566; B60R 3/14; F21V 19/004
See application file for complete search history.

(56) References Cited

U.S. PATENT DOCUMENTS

| | | | | |
|---|---|---|---|---|
| 5,063,379 | A * | 11/1991 | Fabry ................ | G02F 1/133621 |
| | | | | 349/67 |
| 7,441,913 | B2 * | 10/2008 | Bayersdorfer .......... | F21V 21/00 |
| | | | | 362/240 |
| 8,967,839 | B2 * | 3/2015 | Zietz ...................... | G01D 13/04 |
| | | | | 362/489 |
| 9,051,010 | B2 | 6/2015 | Young et al. | |
| 2008/0285296 | A1 * | 11/2008 | Nakagawa ............. | H01H 13/83 |
| | | | | 362/489 |
| 2013/0334974 | A1 * | 12/2013 | Tamura ................. | F21V 23/005 |
| | | | | 362/382 |
| 2015/0329042 | A1 * | 11/2015 | Araki ..................... | B60K 35/60 |
| | | | | 362/97.1 |
| 2016/0159275 | A1 * | 6/2016 | Ito .......................... | G09F 13/04 |
| | | | | 362/509 |
| 2017/0269774 | A1 * | 9/2017 | Ben Abdelaziz ........ | B60Q 3/14 |
| 2018/0065547 | A1 * | 3/2018 | Kirilenko ............... | B60K 35/22 |

* cited by examiner

*Primary Examiner* — Bryon T Gyllstrom
(74) *Attorney, Agent, or Firm* — Spencer Fane, LLP

(57) ABSTRACT

An indicator light assembly for a vehicle includes a housing. The housing includes a casing and a cover. The cover is connected to the casing. A first light channel is formed in the housing. A second light channel is formed in the housing. A first indicator and a second indicator are formed on the cover. A first light source is disposed in the housing and configured to emit light through the first light channel to illuminate the first indicator. A second light source is disposed in the housing and configured to emit light through the second light channel to illuminate the second indicator.

17 Claims, 9 Drawing Sheets

INDICATOR LIGHT ASSEMBLY FOR A VEHICLE

BACKGROUND

Technical Field

The present disclosure generally relates to an indicator light assembly for a vehicle. More specifically, the present disclosure relates to a housing for an indicator light assembly having first and second light channels.

Background Information

An indicator light assembly for a vehicle includes a cover having an indicator thereon. Power is supplied to a light source of the indicator light assembly to illuminate the indicator.

SUMMARY

A need exists for an improved indicator light assembly having a plurality of indicators configured to be independently illuminated.

In view of the state of the known technology, one aspect of the present disclosure is to provide an indicator light assembly for a vehicle. The indicator light assembly for a vehicle includes a housing. The housing includes a casing and a cover. The cover is connected to the casing. A first light channel is formed in the housing. A second light channel is formed in the housing. A first indicator and a second indicator are formed on the cover. A first light source is disposed in the housing and configured to emit light through the first light channel to illuminate the first indicator. A second light source is disposed in the housing and configured to emit light through the second light channel to illuminate the second indicator.

Also other objects, features, aspects and advantages of the disclosed indicator light assembly for a vehicle will become apparent to those skilled in the art from the following detailed description, which, taken in conjunction with the annexed drawings, discloses exemplary embodiments of the vehicle indicator assembly for a vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
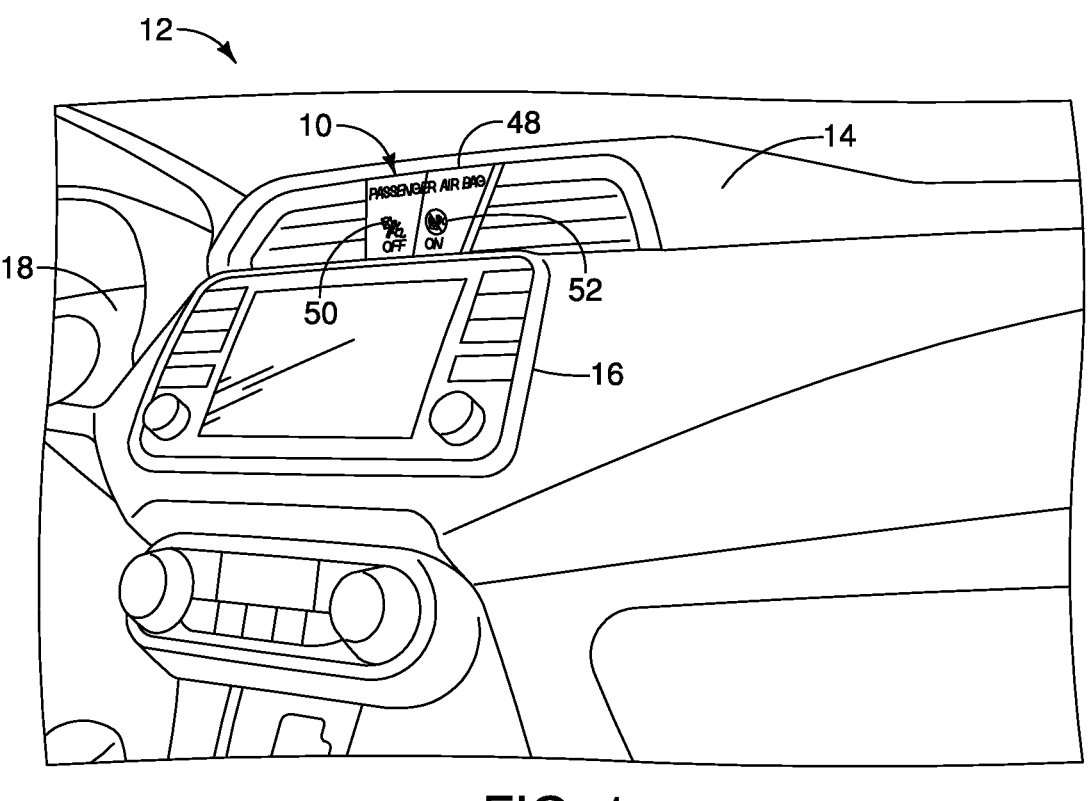
FIG. 1 is a perspective view of a vehicle including an indicator light assembly in accordance with an exemplary embodiment.

Referring initially to FIG. 1, an indicator light assembly 10 for a vehicle 12 is illustrated in accordance with an exemplary embodiment. The indicator light assembly 10 is disposed in an interior of the vehicle 12. The indicator light assembly 10 is disposed in a vehicle dashboard 14. The indicator light assembly 10 is disposed in the vehicle dashboard 14 above the in-vehicle infotainment system 16. Alternatively, the indicator light assembly 10 can be disposed in an instrument panel 18, or any other suitable location within the vehicle 12.

The indicator light assembly 10 includes a casing 20, a cover 22 and a terminal block 24, as shown in FIGS. 2, 3 and 8-10. The cover 22 is connected to the casing 20. Preferably, the cover 22 is connected at a first end 20A of the casing 20. The terminal block 24 is connected to the casing 20. Preferably, the terminal block 24 is connected at a second end 20B of the casing 20. The cover 22 and the terminal block 24 are connected to opposite ends of the casing 20. The casing 20 and the cover 22 form a housing 19.

Figure 3:
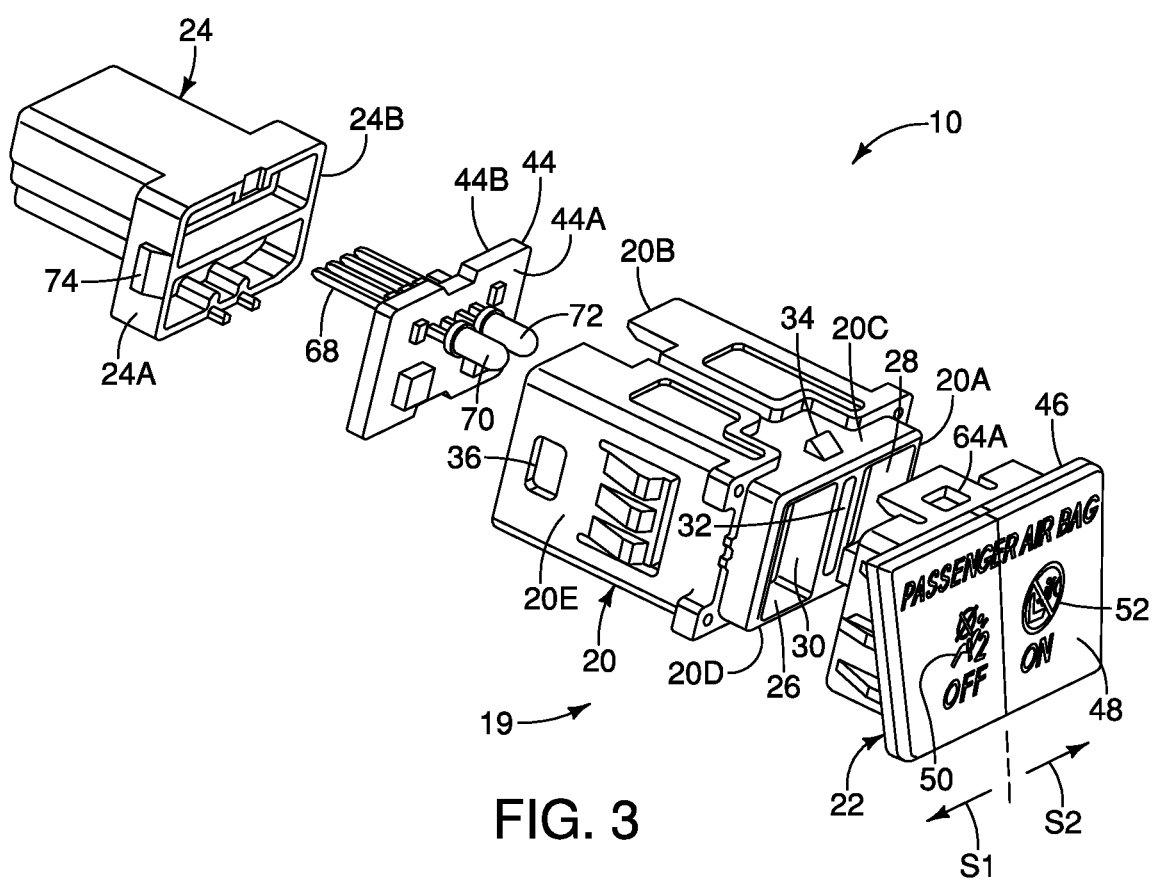
FIG. 3 is an exploded assembly view of the indicator light assembly of FIG. 2.

The casing 20 extends from the first end 20A to the second end 20B, as shown in FIG. 3. The casing 20 has a first opening 26 and a second opening 28 formed at the first end 20A of the casing 20. An inner, or second, wall 30 extends from an upper surface 20C to a lower surface 20D of the casing 20. The inner wall 30 extends from the first end 20A to the second end 20B of the casing 20, s shown in FIG. 10. A third opening, or groove, 32 is formed in the inner wall 30, as shown in FIGS. 3, 6, 7 and 10. The inner wall 30 defines the first and second openings 26 and 28 at the first end 20A of the casing 20. The inner wall 30 is preferably formed integrally with the casing 20.

Figures 5, 6:
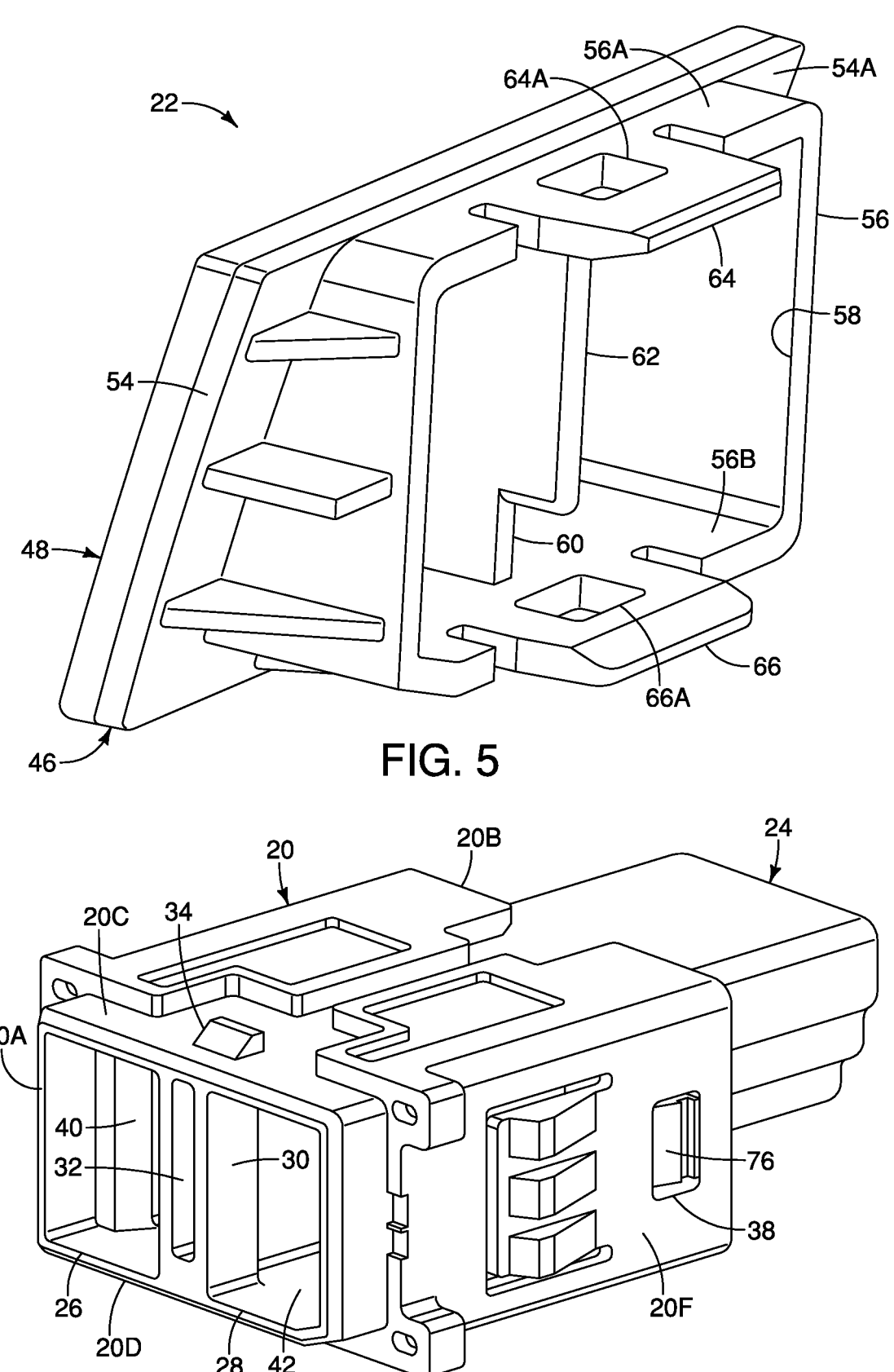
FIG. 5 is a rear perspective view of the cover of FIG. 4.
FIG. 6 is a perspective view of a casing of the indicator light assembly of FIGS. 2 and 3.
Figure 7:
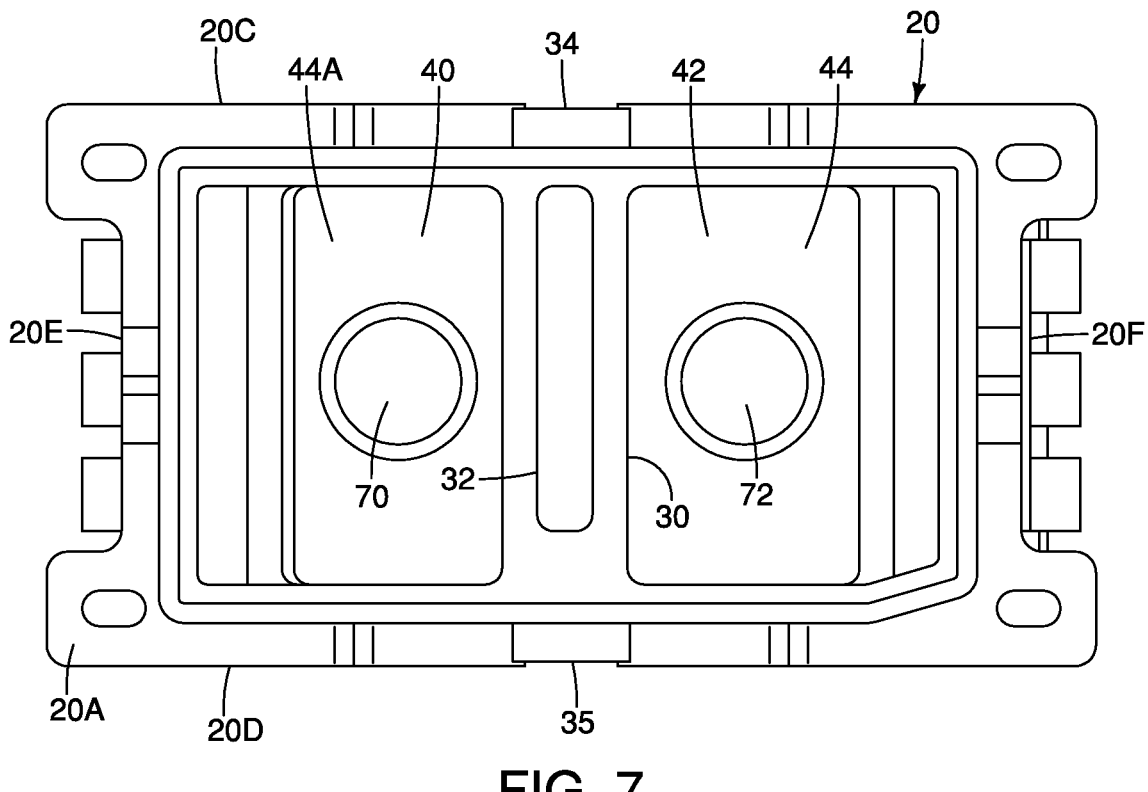
FIG. 7 is a front elevational view of the casing of FIG. 6.
Figure 8:
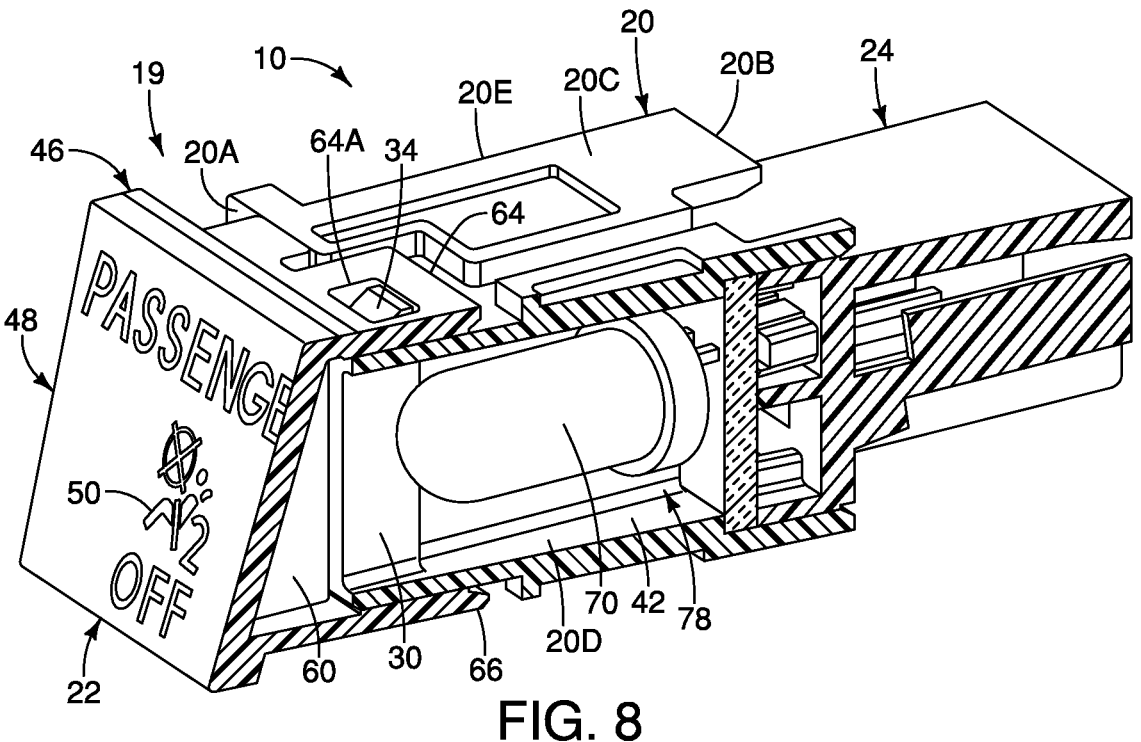
FIG. 8 is a perspective view in cross section taken along a line through a first light channel of the indicator light assembly of FIGS. 2 and 3.
Figure 9:
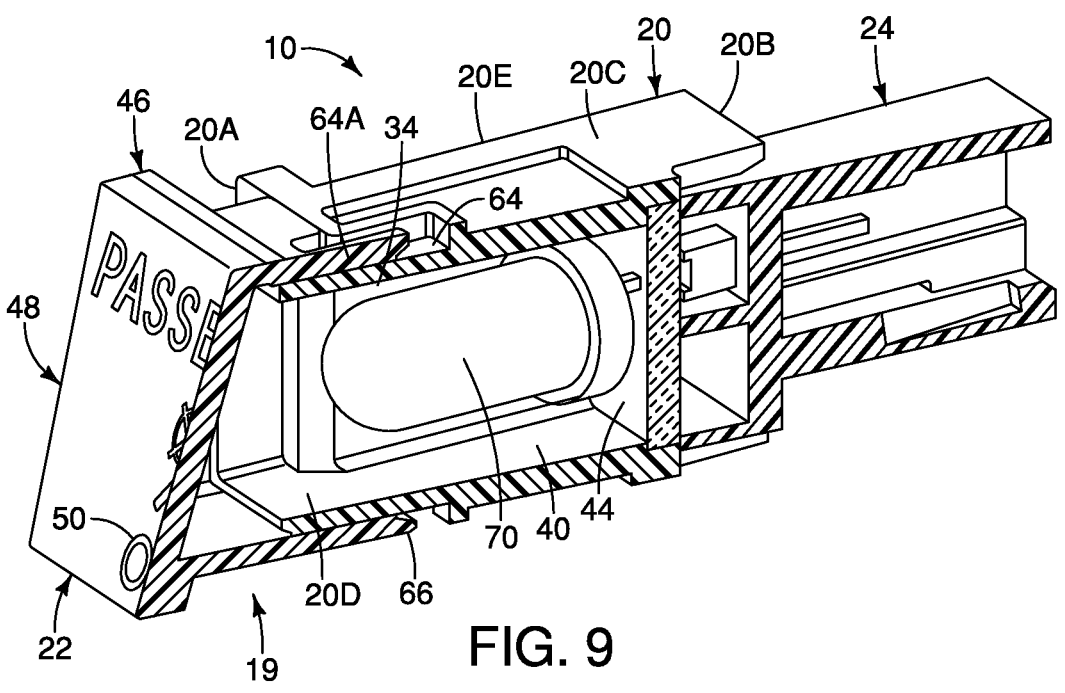
FIG. 9 is a perspective view in cross section taken along a line through a second light channel of the indicator light assembly of FIGS. 2 and 3.

A first projection 34 extends upwardly from the upper surface 20C of the casing 20, as shown in FIGS. 6-8. A second projection 35 extends downwardly from the lower surface of the casing 20. The second projection 35 is aligned with the first projection 34 in the length and width directions of the casing 20.

A fourth opening 36 is formed in a first side surface 20E of the casing 20, as shown in FIG. 3. A fifth opening 38 is formed in a second side surface 20F of the casing 20, as shown in FIG. 6. The fourth opening 36 is aligned with the fifth opening 38 in the length and height directions of the casing 20.

The upper surface 20C, the lower surface 20D, the first side surface 20E and the second side surface 20F extend from the first end 20A of the casing 20 to the second end 20B, as shown in FIGS. 3 and 6. The upper surface 20C is preferably substantially parallel to the lower surface 20D. The first side surface 20E is preferably substantially parallel to the second side surface 20F. The inner wall 30 extends substantially parallel to the first and second side surfaces 20E and 20F.

A first light channel 40 and a second light channel 42 are formed in the housing 19 of the indicator light assembly 10, as shown in FIGS. 3, 6 and 8-10. In the casing 20, the first light channel 40 extends from the first end 20A of the casing 20 to a printed circuit board 44 disposed in the casing 20. In the casing 20, the second light channel 42 extends from the first end 20A of the casing 20 to the printed circuit board 44. In other words, the printed circuit board 44 forms a rear wall of the first and second light channels 40 and 42.

The casing 20 is made of any suitable material, such as plastic. The casing 20 is preferably formed as a one-piece, unitary member.

Figure 10:
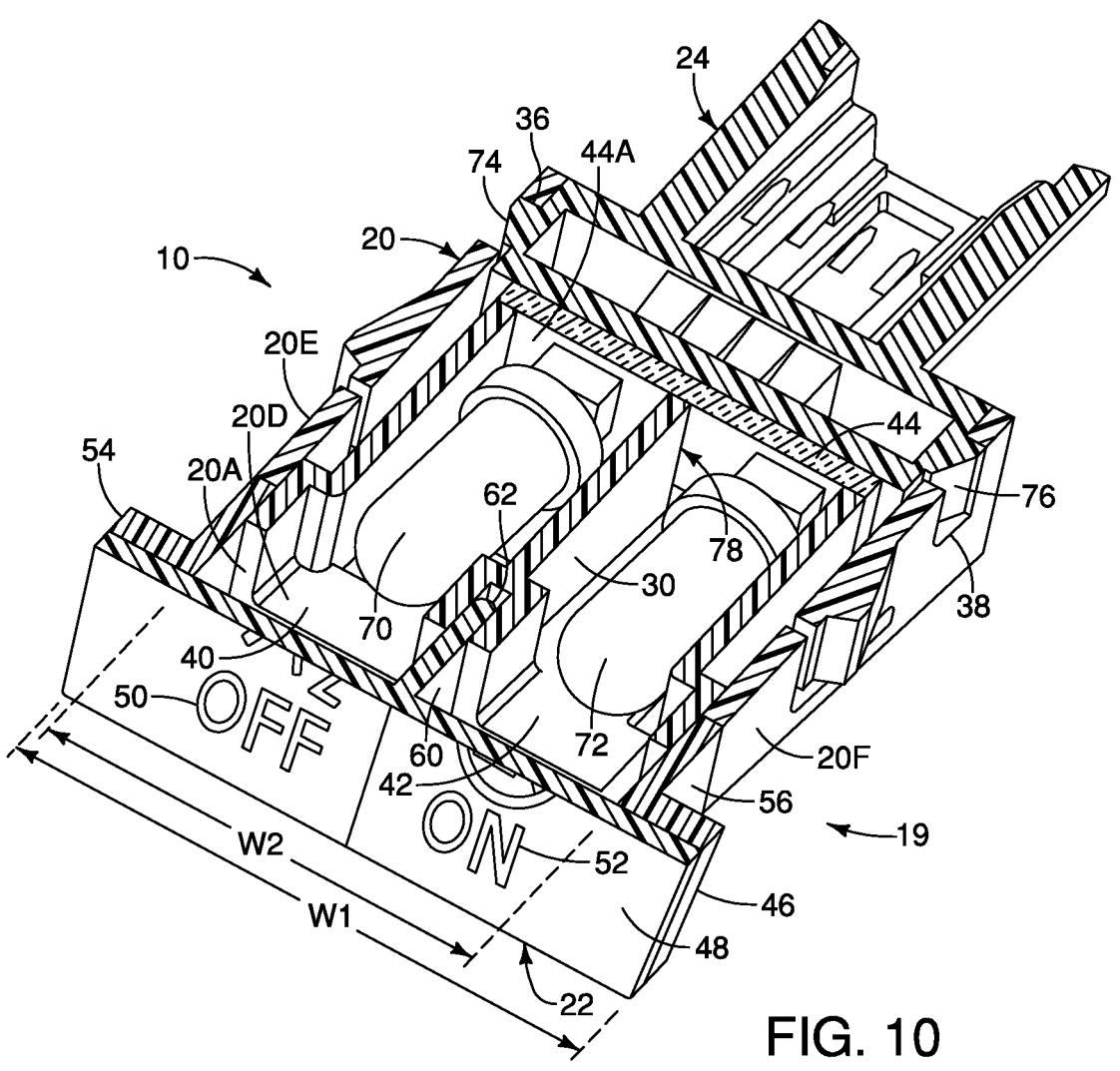
FIG. 10 is a perspective view in cross section take along a line perpendicular to the first and second light channels of the indicator light assembly of FIGS. 2 and 3.

The printed circuit board 44 is disposed in the casing 20 of the housing 19, as shown in FIGS. 3 and 8-10. The printed circuit board 44 is connected to the casing 20 in any suitable manner, such as being secured to a shoulder of the casing with an adhesive, as shown in FIG. 8. A first light source 70 and a second light source 72 are disposed in the housing 19, as shown in FIG. 10. The first light source 70 and the second light source 72 are mounted on the printed circuit board 44 disposed in the casing 20 of the housing 19. The first light source 70 is connected to a first surface 44A of the printed circuit board 44. The first light source 70 is configured to emit light through the first light channel 40 to illuminate a first indicator 50. The second light source 72 is connected to the first surface 44A of the printed circuit board 44. The second light source 72 is configured to emit light through the second light channel 42 to illuminate a second indicator 52. The first and second light sources 70 and 72 are preferably light emitting diodes (LEDs), although any suitable light source can be used.

The cover 22 is connected to the casing 20, as shown in FIGS. 2 and 8-10. The cover 22 includes a support member 46 and an indicator member 48. The first indicator 50 and the second indicator 52 are formed on the indicator member 48 of the cover 22.

Figure 4:
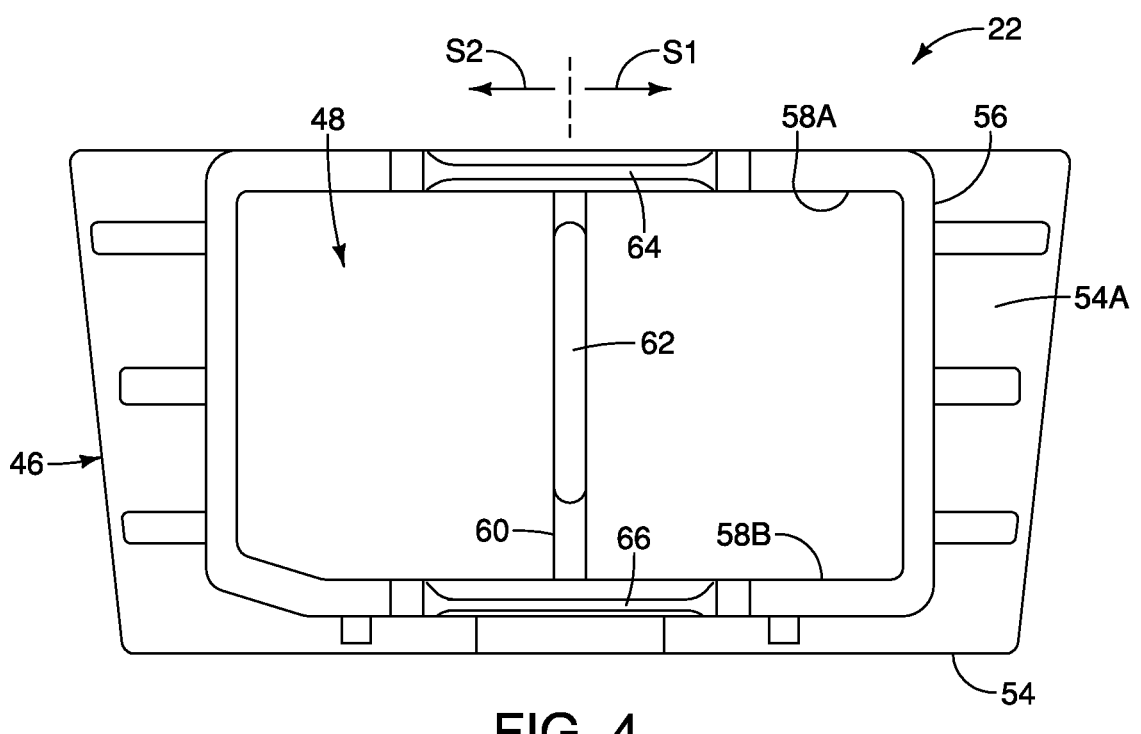
FIG. 4 is a rear elevational view of a cover of the indicator light assembly of FIGS. 2 and 3.

The support member 46 includes a substantially planar base 54 and a wall 56 extending outwardly therefrom, as shown in FIGS. 3-5. The wall 56 extends from a rear surface 54A of the substantially planar base 54. The wall 56 defines an opening 58 in the base 54, as shown in FIG. 4. An inner wall 60 extends from an upper edge 58A of the opening 58 to a lower edge 58B of the opening 58, as shown in FIGS. 4 and 5. A projection 62 extends outwardly from the inner wall 60, as shown in FIGS. 4 and 5. The inner wall 60 is preferably formed integrally with the support member 46 of the cover 22.

A first flexible arm 64 extends from the wall 56, as shown in FIGS. 3-5. The first flexible arm 64 preferably extends from an upper surface 56A of the wall 56. A second flexible arm 66 extends from the wall 56. The second flexible arm 66 extends from a lower surface 56B of the wall 56. The first flexible arm 64 and the second flexible arm 66 are preferably disposed on opposite sides of the wall 56. The first and second flexible arms 64 and 66 extend further from the base 54 then the wall 56. In other words, each of the first and second flexible arms 64 and 66 of the cover 22 extend rearwardly further than the inner wall 60. A first opening 64A is disposed in the first flexible arm 64. A second opening 66A is disposed in the second flexible arm 66.

The indicator member 48 is connected to the substantially planar base 54, as shown in FIGS. 3-5. The indicator member 48 covers the opening 58 in the substantially planar base 54. Edges of the indicator member 48 are preferably flush with edges of the base 54. The indicator member 48 is secured to the base 54 in any suitable manner, such as with an adhesive. The indicator member 48 of the cover 22 is preferably made of a transparent material.

The first indicator 50 is disposed on a first side of the indicator member 48, as shown in FIG. 3. The second indicator 52 is disposed on a second side of the indicator member 48. The first side is a first direction S1 from the inner wall 60. The second side is a second direction S2 from the inner wall 60. The second direction S2 is preferably opposite to the first direction S1. The first indicator 50 and the second indicator 52 are formed on the indicator member 48 in any suitable manner, such that light emitted by the first and second light sources 70 and 72 is configured to illuminate the first and second indicators 50 and 52, respectively. The indicator member 48 can be painted to make the painted portion of the indicator member 48 opaque, such that the indicator is formed by the non-painted portion of the indicator member 48. Indicia, such as text, can be added to a portion of the indicator portion such that the indicia in that portion is not illuminated by the first and second light sources. As shown in FIG. 1, the text "passenger air bag" is in a non-illuminated portion of the indicator member 48, and the "on" and "off" indicators 50 and 52 are disposed in an illuminated portion of the indicator member 48.

The terminal block 24 is configured to be connected to the casing 20 to supply power to the printed circuit board 44. The terminal block 24 includes a terminal in which electrical wiring supplying power from a power source (not shown) are terminated. A first tab 74 extends outwardly from a first side surface 24A of the terminal block 24, as shown in FIG. 3. A second tab 76 extends outwardly from a second side surface 24B of the terminal block 24, as shown in FIGS. 2 and 3.

A plurality of pins 68 are electrically connected to the printed circuit board 44, and extend rearwardly from a rear surface 44B of the printed circuit board 44, as shown in FIG. 3. The pins 68 are electrically connected to the first and second light sources 70 and 72. The pins 68 are connected to the terminal block 24, in any suitable manner, such that the pins 68 are electrically connected to the terminated electrical wiring supplying power from the power source. As shown in FIG. 3, the printed circuit board 44 has four pins 68, although any suitable number of pins can be used.

Figure 2:
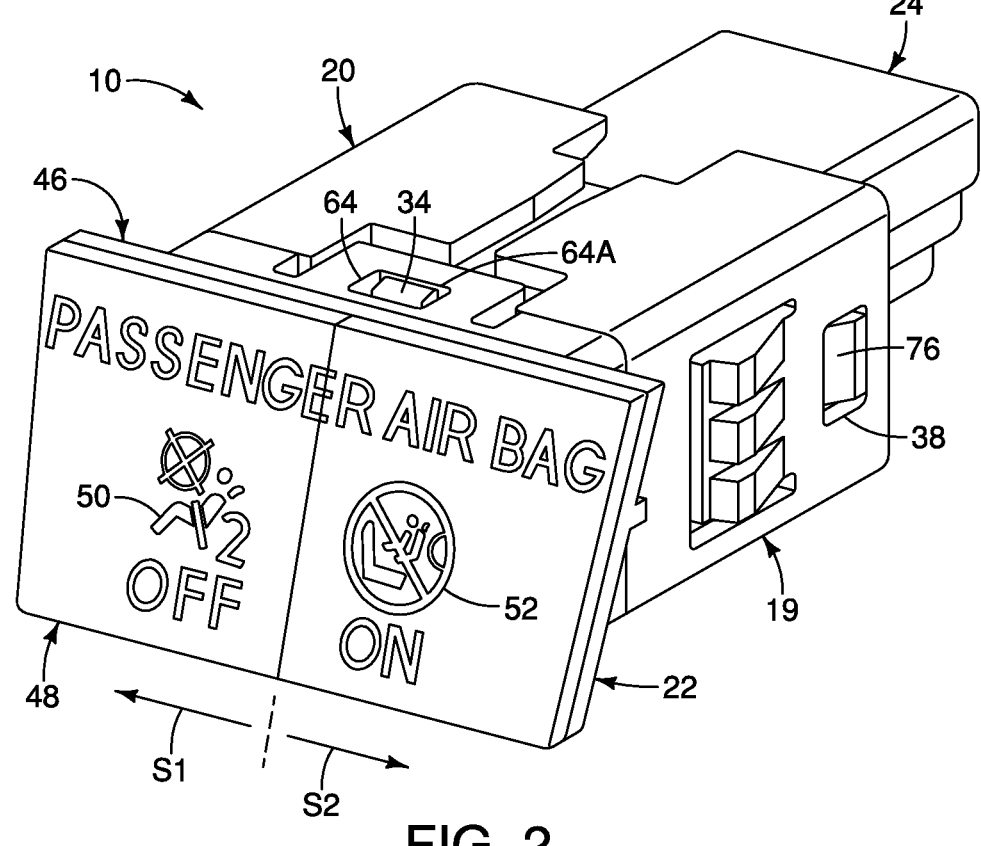
FIG. 2 is a perspective of the indicator light assembly of FIG. 1.

To assemble the indicator light assembly 10, the terminal block 24 is connected to the casing 20, as shown in FIGS. 2 and 3. The pins 68 of the printed circuit board 44, which is disposed in the casing 20, are electrically connected to the electrical wiring terminated in the terminal block 24 to supply power to the printed circuit board. The first and second side surfaces 20E and 20F of the casing 20 slide over the first and second tabs 74 and 76, respectively, of the terminal block 24 such that the fourth and fifth openings 36 and 38 of the casing 20 receive the first and second tabs 74 and 76 of the terminal block 24, as shown in FIGS. 2-7, to secure the terminal block 24 to the casing 20.

The cover 22 is connected to the casing 20, as shown in FIGS. 2 and 3. The openings 64A and 66A in the first and second flexible arms 64 and 66 of the cover 22 slide over and receive the projections 34 and 35 of the casing 20, as shown in FIGS. 2-7, to secure the cover 22 to the casing 20. The projection 62 of the inner, or first, wall 60 of the cover 22 is received by the third opening, or groove, 32, in the inner, or second, wall 30 of the casing 20. In other words, the second wall 30 includes a groove 32 that receives the projection 62 of the first wall 30. A first width W1 of the cover 22 is larger than a second width W2 of the casing 20, as shown in FIG. 10.

In an assembled state, as shown in FIGS. 2 and 8-10, a dividing wall 78 separates the first light channel 40 from the second light channel 42. The first light channel 40 is separated from the second light channel 42 to keep light from bleeding through from one channel to the other, such that one of the first and second indicators 50 and 52 can be illuminated at a time without illuminating the other. The dividing wall 78 extends from the printed circuit board 44 to the indicator member 48 of the cover 22 to define the first and second light channels 40 and 42. The first light channel 40 extends from the first surface 44A of the printed circuit board 44 to the indicator member 48, as shown in FIG. 10. The second light channel 42 extends from the first surface 44A of the printed circuit board 44 to the indicator member 48, as shown in FIG. 10. The first light source 70 is disposed in the first light channel 40 to illuminate the first indicator 50. The second light source 72 is disposed in the second light channel 42 to illuminate the second indicator 52. The dividing wall substantially prevents light illuminated by one of the first and second light sources 70 and 72 from bleeding through to the light channel of the non-illuminated light source. As shown in FIG. 10, the dividing wall 78 of the indicator light assembly 10 is formed by the inner, or second, wall 30 of the casing 20 and the inner, or first, wall 60 of the cover 22. The first light source 70 is disposed on the first side S1 of the dividing wall 78, and the second light source 72 is disposed on the second side S2 of the dividing wall 78.

The first and second indicators 50 and 52 can be any suitable indicator requiring separate illumination. As shown in FIGS. 1, 2 and 8, the first indicator 50 is illuminated to indicate that an airbag is in an off mode. The second indicator 52 is illuminated to indicate that the airbag is in an on mode. The printed circuit board 44 is configured such that power is supplied to the first light source 70 to illuminate the first indicator 50 for a condition when the airbag is in the off mode. The printed circuit board 44 is configured such that power is supplied to the second light source 72 to illuminate the second indicator 52 for a condition when the airbag is in the on mode.

As shown in FIGS. 11-18, an indicator light assembly 110 in accordance with another illustrated exemplary embodiment is substantially similar to the indicator light assembly 10 of the exemplary embodiment illustrated in FIGS. 1-10 except for the differences described below. Similar parts are identified with similar reference numerals, except increased by 100 (i.e., 1xx, accordingly).

Figure 11:
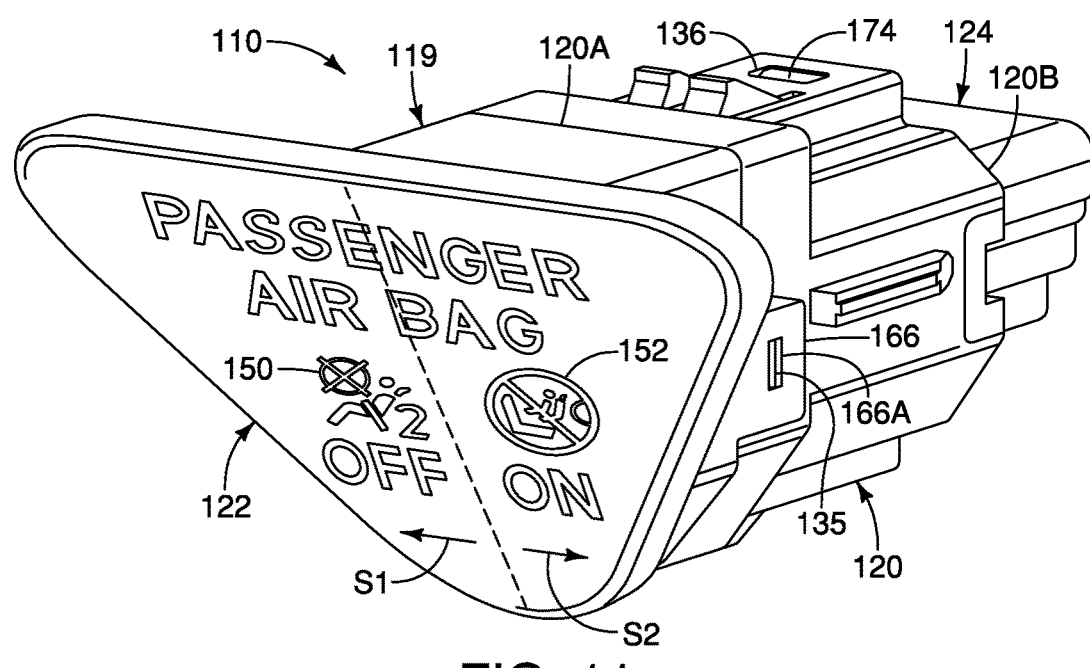
FIG. 11 is a perspective view of an indicator light assembly in accordance with another exemplary embodiment.
Figures 15, 16:
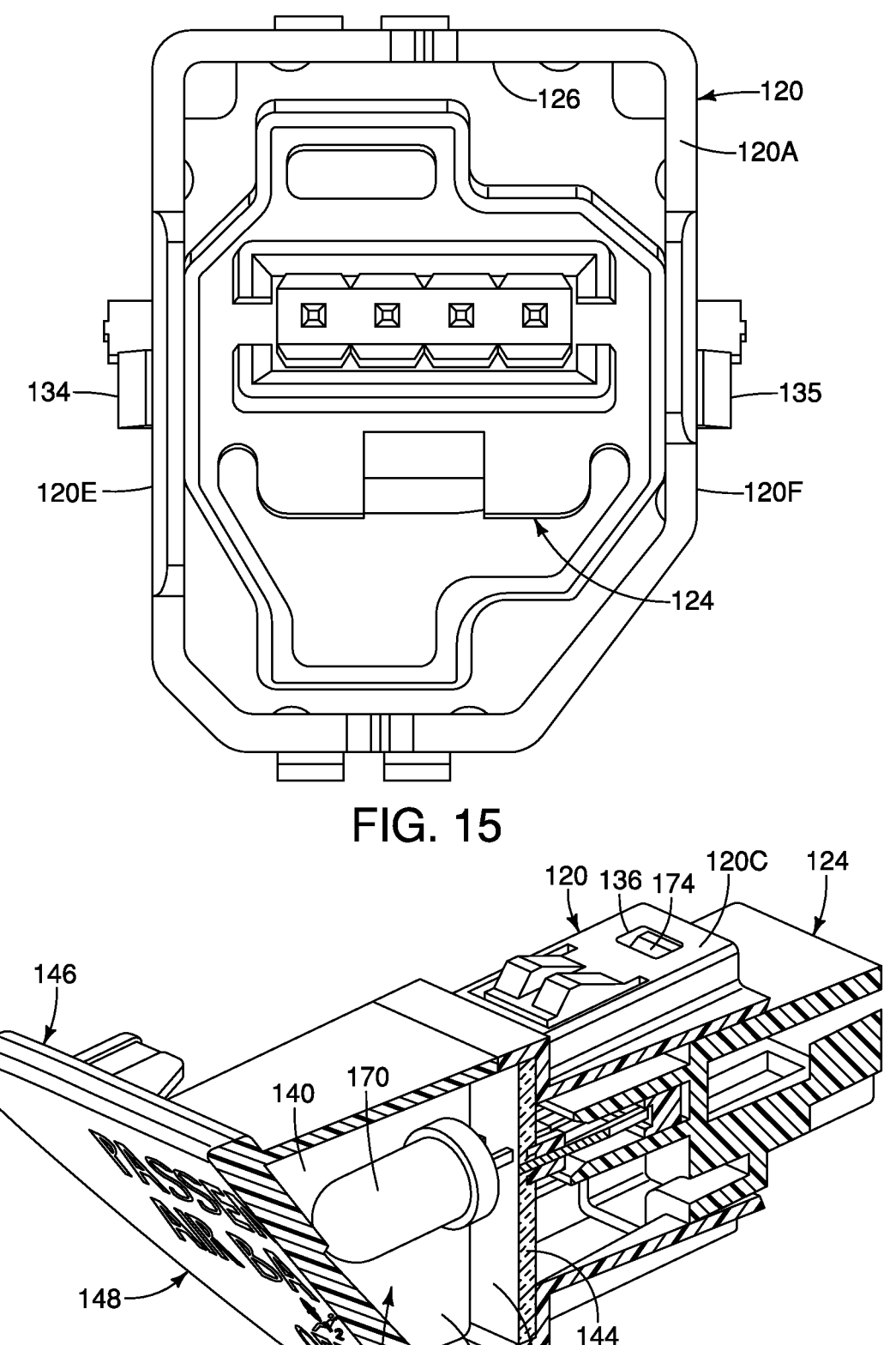
FIG. 15 is a front elevational view of a casing of the indicator light assembly of FIGS. 11 and 12.
FIG. 16 is a perspective view in cross section taken along a line through a first light channel of the indicator light assembly of FIGS. 11 and 12.

The indicator light assembly 10 includes a casing 120, a cover 122 and a terminal block 124, as shown in FIGS. 11, 12 and 16-18. The cover 122 is connected to the casing 120. Preferably, the cover 122 is connected at a first end 120A of the casing 120. The terminal block 124 is connected to the casing 120. Preferably, the terminal block 124 is connected at a second end 120B of the casing 120. The cover 122 and the terminal block 124 are connected to opposite ends of the casing 120. The casing 120 and the cover 122 form a housing 119, as shown in FIGS. 11 and 16.

Figure 12:
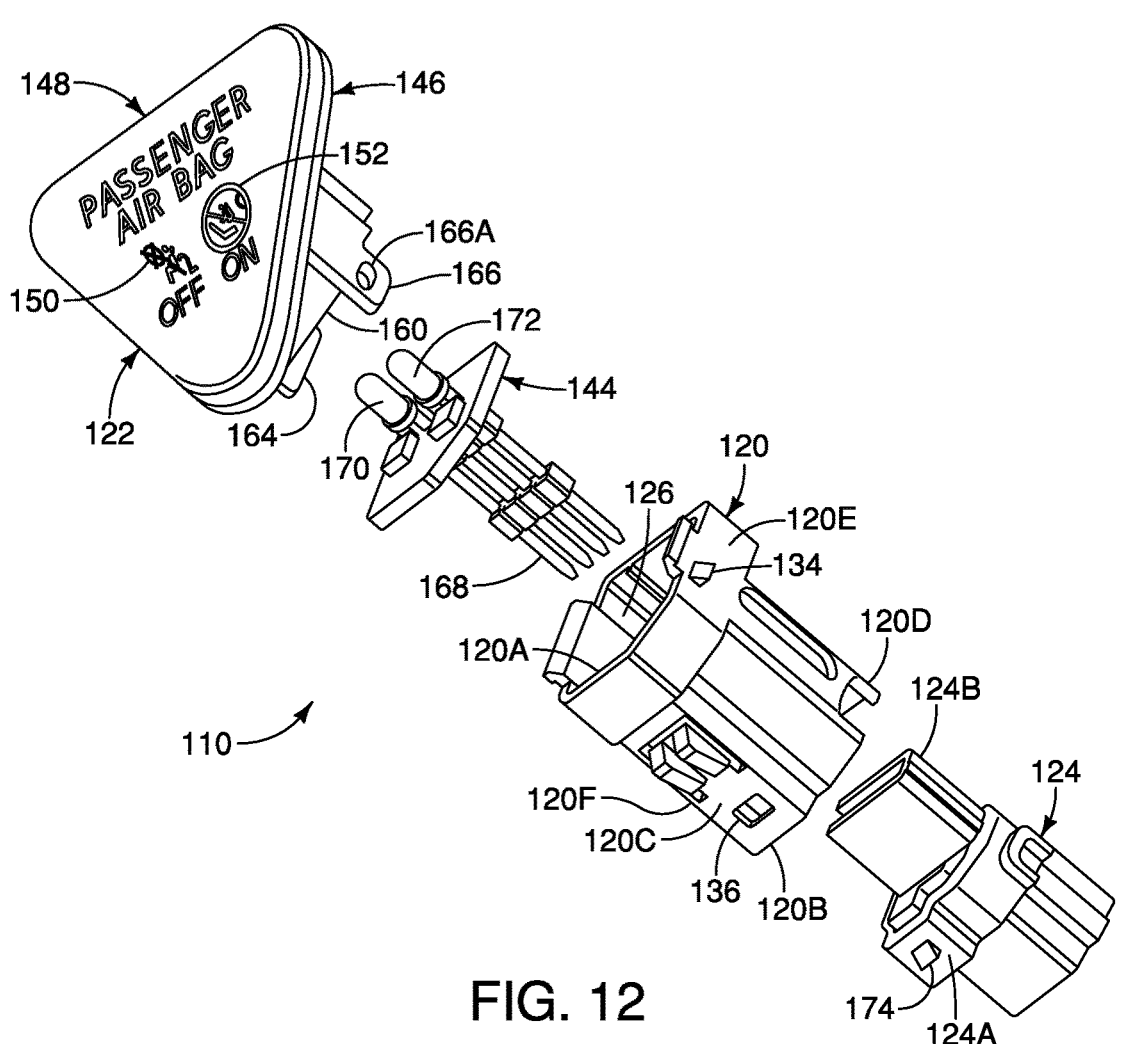
FIG. 12 is an exploded assembly view of the indicator light assembly of FIG. 11.

The casing 120 extends from the first end 120A to the second end 120B, as shown in FIG. 12. The casing 120 has an opening 126 formed at the first end 120A of the casing 120. The opening 126 extends from the first end 120A to the second end 120B of the casing 120, as shown in FIGS. 12, 15 and 18.

Figure 18:
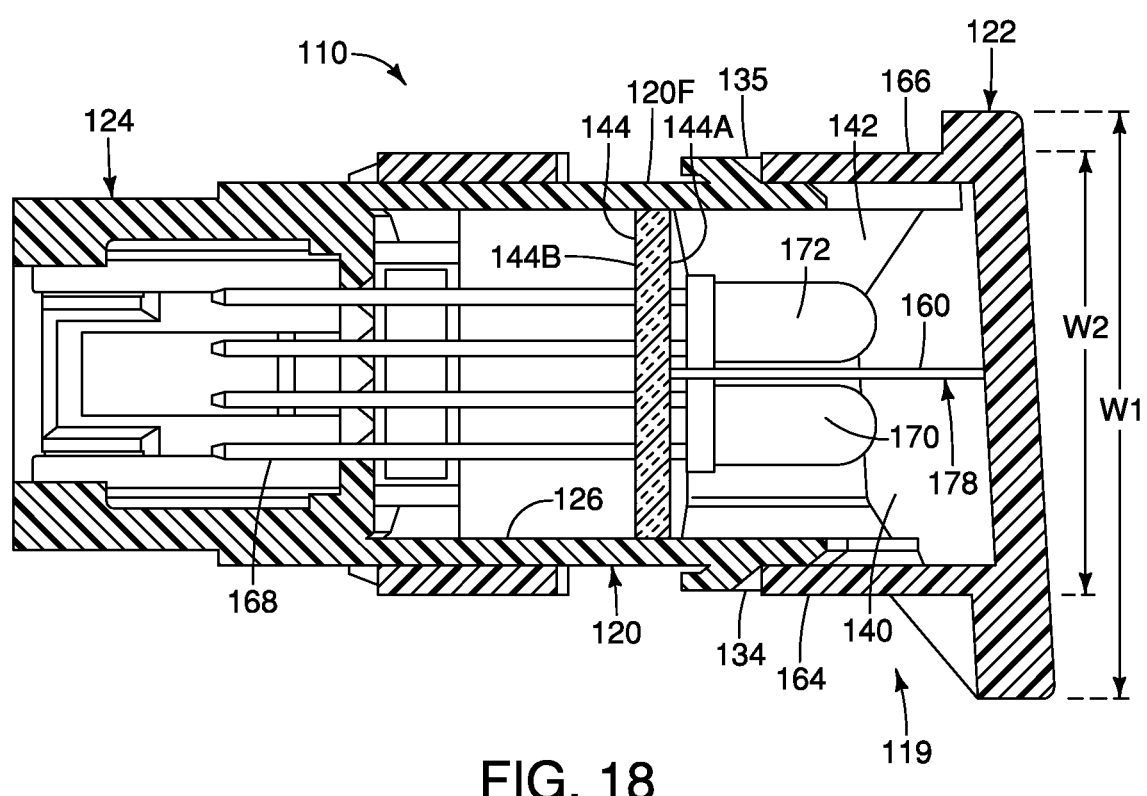
FIG. 18 is a perspective view in cross section take along a line perpendicular to the first and second light channels of the indicator light assembly of FIGS. 11 and 12.

A first projection 134 extends outwardly from a first side surface 120E of the casing 120, as shown in FIGS. 12, 15 and 18. A second projection 135 extends outwardly from a second side surface 120F of the casing 120. The second projection 135 is aligned with the first projection 134 in the length and height directions of the casing 120.

A second opening 136 is formed in an upper surface 120C of the casing 120, as shown in FIG. 12. A third opening (not shown) is formed in a second side surface 120F of the casing 120. The third opening is aligned with the second opening 136 in the length and width directions of the casing 120.

The upper surface 120C, the lower surface 120D, the first side surface 120E and the second side surface 120F extend from the first end 120A of the casing 120 to the second end 120B, as shown in FIGS. 12 and 18. The upper surface 120C is preferably substantially parallel to the lower surface 120D. The first side surface 120E is preferably substantially parallel to the second side surface 120F.

The casing 120 is made of any suitable material, such as plastic. The casing 120 is preferably formed as a one-piece, unitary member.

The printed circuit board 44 is disposed proximate the first end 120A of the casing 120, as shown in FIGS. 3 and 8-10. The printed circuit board 144 is connected to the casing 120 in any suitable manner, such as being secured to a shoulder of the housing with an adhesive, as shown in FIG. 16. A first light source 170 and a second light source 172 are mounted on the printed circuit board 144 disposed in the casing 120. The first light source 170 is connected to a first surface 144A of the printed circuit board 144. The first light source 170 is configured to emit light through a first light channel 140 to illuminate a first indicator 150. The second light source 172 is connected to the first surface 144A of the printed circuit board 144. The second light source 172 is configured to emit light through a second light channel 142 to illuminate a second indicator 152. The first and second light sources 170 and 172 are preferably light emitting diodes (LEDs), although any suitable light source can be used.

The cover 122 is connected to the casing 120, as shown in FIGS. 11, 12 and 16-18. The cover 122 includes a support member 146 and an indicator member 148. The first indicator 150 and the second indicator 152 are formed on the indicator member 148 of the cover 122.

Figure 13:
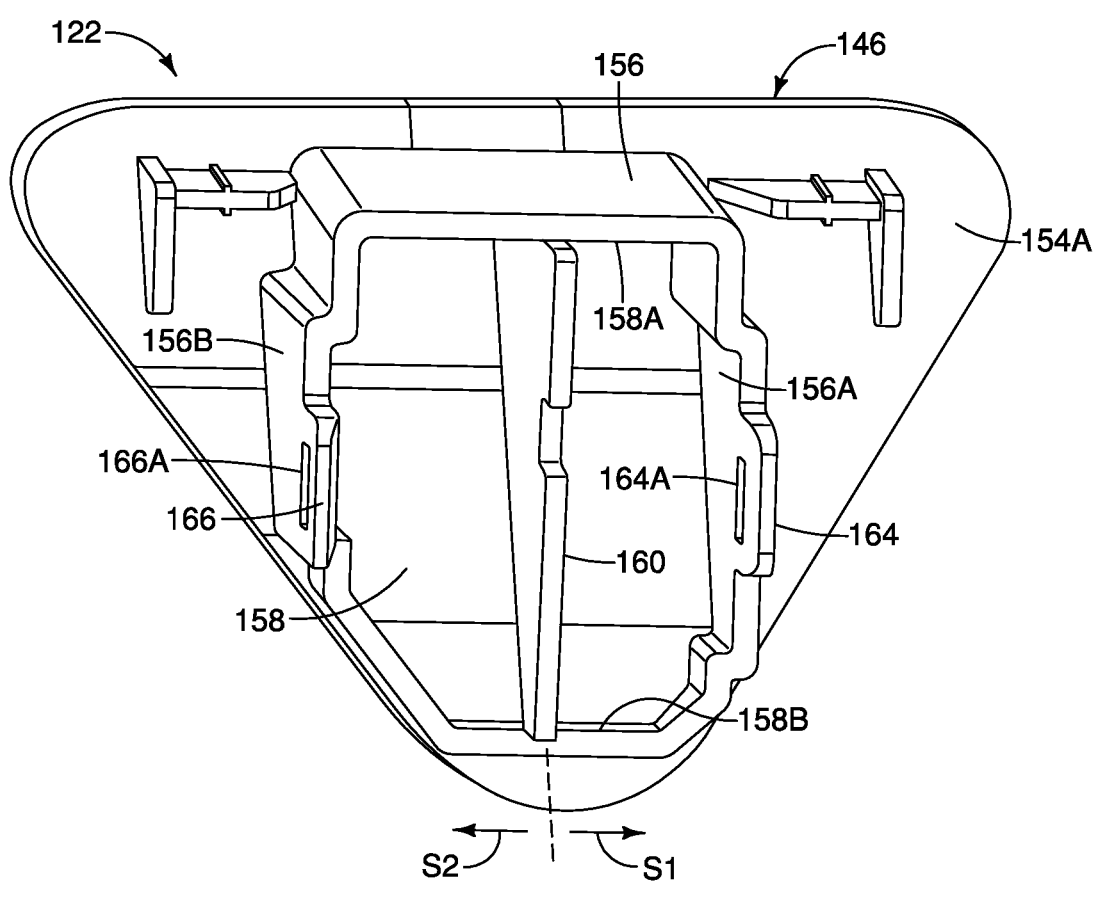
FIG. 13 is a rear perspective view of a cover of the indicator light assembly of FIGS. 11 and 12.
Figure 14:
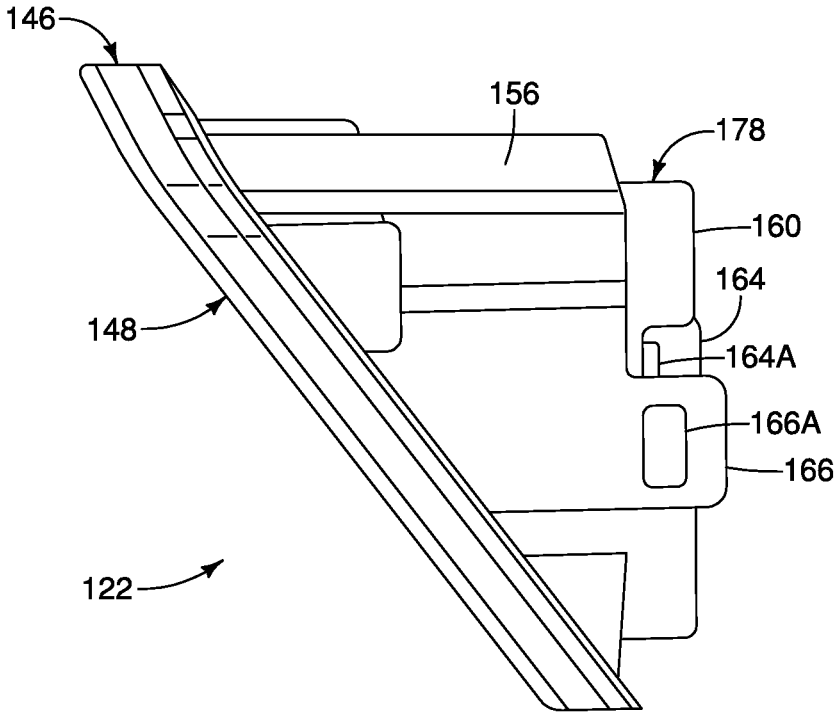
FIG. 14 is a side perspective view of the cover of FIG. 13.

The support member 146 includes a substantially planar base 154 and a wall 156 extending outwardly therefrom, as shown in FIGS. 13-14. The wall 156 extends from a rear surface 154A of the substantially planar base 154. The wall 156 defines an opening 158 in the base 154, as shown in FIG. 13. An inner wall 160 extends from an upper edge 158A of the opening 158 to a lower edge 158B of the opening 158, as shown in FIG. 13. The inner wall 160 is preferably formed integrally with the support member 146 of the cover 122.

A first flexible arm 164 extends from the wall 156, as shown in FIGS. 12-14. The first flexible arm 164 preferably extends from a first side surface 156A of the wall 156. A second flexible arm 166 extends from the wall 156. The second flexible arm 166 extends from a second side surface 156B of the wall 156. The first flexible arm 164 and the second flexible arm 166 are preferably disposed on opposite sides of the wall 156. The first and second flexible arms 164 and 166 extend further from the base 154 then the wall 156. Each of the first and second flexible arms 164 and 166 of the cover 122 extend rearwardly further than the inner wall 160. A first opening 164A is disposed in the first flexible arm 164. A second opening 166A is disposed in the second flexible arm 166.

The indicator member 148 is connected to the substantially planar base 154, as shown in FIGS. 11-14. The indicator member 148 covers the opening 158 in the substantially planar base 154. Edges of the indicator member 148 are preferably flush with edges of the base 154. The indicator member 148 is secured to the base 154 in any suitable manner, such as with an adhesive. The indicator member 148 of the cover 122 is preferably made of a transparent material.

The first indicator 150 is disposed on a first side of the indicator member 148, as shown in FIGS. 11 and 13. The second indicator 152 is disposed on a second side of the indicator member 148. The first side is a first direction S1 from the inner wall 160. The second side is a second direction S2 from the inner wall 160. The second direction S2 is preferably opposite to the first direction S1. The first indicator 150 and the second indicator 152 are formed on the indicator member 148 in any suitable manner, such that light emitted by the first and second light sources 170 and 172 is configured to illuminate the first and second indicators 150 and 152, respectively. The indicator member 148 can be painted to make the painted portion of the indicator member 148 opaque, such that the indicator is formed by the non-painted portion of the indicator member 148. Indicia, such as text, can be added to a portion of the indicator portion such that the indicia in that portion is not illuminated by the first and second light sources. As shown in FIGS. 11 and 12, the text "passenger air bag" is in a non-illuminated portion of the indicator member 148, and the "on" and "off" indicators 150 and 152 are disposed in an illuminated portion of the indicator member 148.

The terminal block 124 is configured to be connected to the casing 120 to supply power to the printed circuit board 144. The terminal block 124 includes a terminal in which electrical wiring supplying power from a power source (not shown) are terminated. A first tab 174 extends outwardly from an upper surface 124A of the terminal block 124, as shown in FIGS. 11 and 12. A second tab (not shown) extends outwardly from a lower surface 124B of the terminal block 124.

A plurality of pins 168 are electrically connected to the printed circuit board 144, and extend rearwardly from a rear surface 144B of the printed circuit board 144, as shown in FIG. 18. The pins 168 are electrically connected to the first and second light sources 170 and 172. The pins 168 are connected to the terminal block 124, in any suitable manner, such that the pins 168 are electrically connected to the terminated electrical wiring supplying power from the power source. As shown in FIGS. 12 and 18, the printed circuit board 144 has four pins 168, although any suitable number of pins can be used.

To assemble the indicator light assembly 110, the terminal block 124 is connected to the casing 120, as shown in FIGS. 11, 12 and 15-18. The pins 168 of the printed circuit board 44, which is disposed in the casing 120, are electrically connected to the electrical wiring terminated in the terminal block 124 to supply power to the printed circuit board 144.

The upper and lower surfaces 120A and 120B of the casing 120 slide over the first and second tabs 174, respectively, of the terminal block 124 such that the second and third openings 136 of the casing 120 receive the first and second tabs 174 of the terminal block 124, as shown in FIGS. 11, 12 and 16 to secure the terminal block 124 to the casing 120.

The cover 122 is connected to the casing 120, as shown in FIGS. 11, 12 and 16-18, to form the housing 119. The openings 164A and 166A in the first and second flexible arms 164 and 166 of the cover 122 slide over and receive the projections 134 and 135 of the casing 120, as shown in FIGS. 11, 12 and 18, to secure the cover 122 to the casing 120. A first width W1 of the cover 122 is larger than a second width W2 of the casing 120, as shown in FIG. 18.

Figure 17:
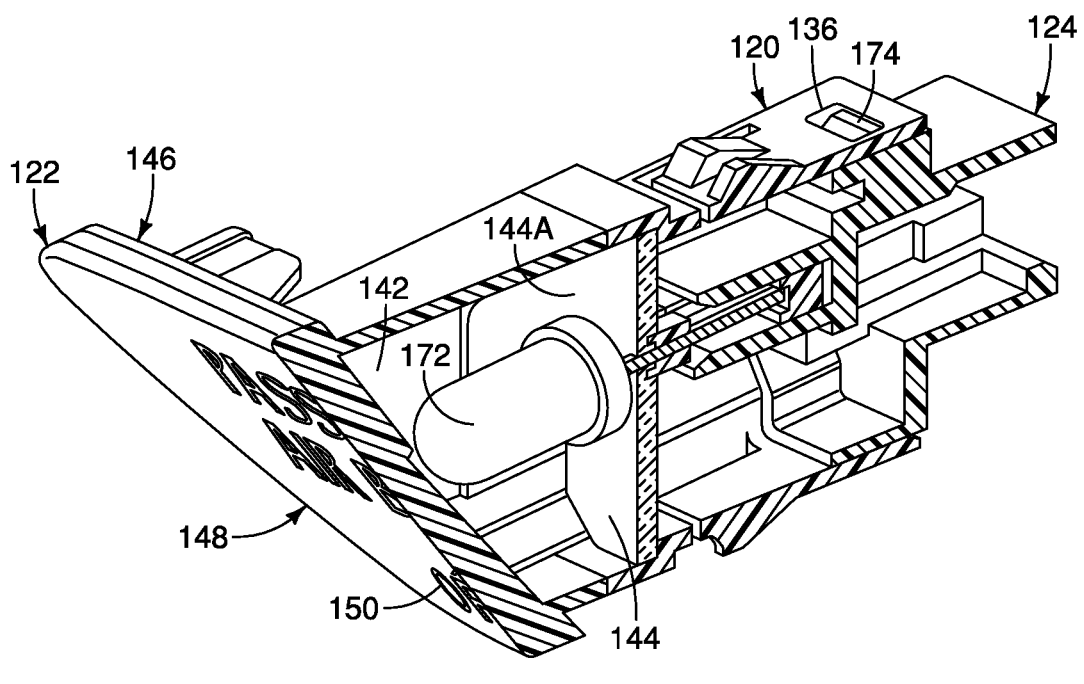
FIG. 17 is a perspective view in cross section taken along a line through a second light channel of the indicator light assembly of FIGS. 11 and 12.

In an assembled state, as shown in FIGS. 16 and 18, a dividing wall 178 separates the first light channel 140 from the second light channel 142. The first light channel 140 is separated from the second light channel 142 to keep light from bleeding through from one channel to the other, such that one of the first and second indicators 150 and 152 can be illuminated at a time without illuminating the other. The dividing wall 178 extends from the printed circuit board 144 to the indicator member 148 of the cover 122 to define the first and second light channels 140 and 142. The first light channel 140 extends from the first surface 144A of the printed circuit board 144 to the indicator member 148, as shown in FIGS. 16 and 18. The second light channel 142 extends from the first surface 144A of the printed circuit board 144 to the indicator member 148, as shown in FIGS. 17 and 18. The first light source 170 is disposed in the first light channel 140 to illuminate the first indicator 150. The second light source 172 is disposed in the second light channel 142 to illuminate the second indicator 152. The dividing wall substantially prevents light illuminated by one of the first and second light sources 170 and 172 from bleeding through to the light channel of the non-illuminated light source. As shown in FIGS. 16 and 18, the dividing wall 178 of the indicator light assembly 110 is formed by the inner, or first, wall 160 of the cover 122. In other words, the dividing wall 178 is formed only by the inner wall 160 and is formed integrally with the cover 122. As shown in FIG. 14, each of the first and second flexible arms 164 and 166 extend rearwardly further than the dividing wall 178, as shown in FIG. 14. The first light source 170 is disposed on the first side S1 of the dividing wall 178, and the second light source 172 is disposed on the second side S2 of the dividing wall 178.

The first and second indicators 150 and 152 can be any suitable indicator requiring separate illumination. As shown in FIGS. 11, 12, 16 and 17, the first indicator 150 is illuminated to indicate that an airbag is in an off mode. The second indicator 152 is illuminated to indicate that the airbag is in an on mode. The printed circuit board 144 is configured such that power is supplied to the first light source 170 to illuminate the first indicator 150 for a condition when the airbag is in the off mode. The printed circuit board 144 is configured such that power is supplied to the second light source 172 to illuminate the second indicator 152 for a condition when the airbag is in the on mode.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the indicator light assembly for a vehicle. Accordingly, these terms, as utilized to describe the present invention should be interpreted relative to a vehicle equipped with the indicator light assembly for a vehicle.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An indicator light assembly for a vehicle comprising:
a housing including a casing and a cover, the cover being connected to the casing;
a first light channel formed in the housing;
a second light channel formed in the housing;
a first indicator and a second indicator formed on the cover;
a first light source disposed in the housing and configured to emit light through the first light channel to illuminate the first indicator;
a second light source disposed in the housing and configured to emit light through the second light channel to illuminate the second indicator; and a dividing wall extending from the printed circuit board to the cover to define the first and second light channels,
the first and second light sources being mounted on a printed circuit board disposed in the housing, and
the printed circuit board forming a rear wall of the first and second light channels.

2. The indicator light assembly according to claim 1, wherein
the dividing wall is integrally formed with the cover.

3. The indicator light assembly according to claim 1, wherein
the dividing wall includes a first wall extending rearwardly from the cover, the first wall being integrally formed with the cover.

4. The indicator light assembly according to claim 3, wherein
the dividing wall includes a second wall formed integrally with the casing.

5. The indicator light assembly according to claim 4, wherein
the second wall includes a groove that receives the first wall.

6. The indicator light assembly according to claim 1, wherein
each of a plurality of flexible arms of the cover receive a corresponding projection of the casing to connect the cover to the casing.

7. The indicator light assembly according to claim 6, wherein
the plurality of flexible arms extend from upper and lower surfaces of the cover.

8. The indicator light assembly according to claim 6, wherein
the plurality of flexible arms extend from first and second side surfaces of the cover.

9. The indicator light assembly according to claim 8, wherein
each of the plurality of flexible arms extends rearwardly further than the dividing wall.

10. The indicator light assembly according to claim 1, wherein
the first light source is disposed on a first side of the dividing wall, and the second light source is disposed on a second side of the dividing wall.

11. The indicator light assembly according to claim 1, wherein
a terminal block is configured to be connected to the casing to supply power to the printed circuit board.

12. The indicator light assembly according to claim 1, wherein
a first width of the cover is larger than a second width of the casing.

13. The indicator light assembly according to claim 12, wherein
the first light source is a first light emitting diode, and the second light source is a second light emitting diode.

14. The indicator light assembly according to claim 1, wherein
the cover is made of a transparent material.

15. The indicator light assembly according to claim 14, wherein
the printed circuit board is configured to illuminate the first indicator to indicate that an airbag is in an off mode.

16. The indicator light assembly according to claim 15, wherein the printed circuit board is configured to illuminate the second indicator to indicate that the airbag is in an on mode.

17. An indicator light assembly for a vehicle comprising:

a housing including a casing and a cover, the cover being connected to the casing;

a first light channel formed in the housing;

a second light channel formed in the housing;

a first indicator and a second indicator formed on the cover;

a first light source disposed in the housing and configured to emit light through the first light channel to illuminate the first indicator;

a second light source disposed in the housing and configured to emit light through the second light channel to illuminate the second indicator;

a terminal block configured to be connected to the casing to supply power to the printed circuit board; and four pins extending rearwardly from the printed circuit board, the four pins being configured to be received by the terminal block, the first and second light sources being mounted on a printed circuit board disposed in the housing.

\* \* \* \* \*